(12) United States Patent
Radich et al.

(10) Patent No.: US 9,973,354 B1
(45) Date of Patent: May 15, 2018

(54) PARTIAL ZERO FORCING EQUALIZATION

(71) Applicant: Seagate Technology LLC, Cupertino, CA (US)

(72) Inventors: William Michael Radich, Longmont, CO (US); Raman Venkataramani, Longmont, CO (US); Belkacem Derras, Longmont, CO (US); Rishi Ahuja, Broomfield, CO (US)

(73) Assignee: Seagate Technology LLC, Cupertino, CA (US)

( * ) Notice: Subject to any disclaimer, the term of this patent is extended or adjusted under 35 U.S.C. 154(b) by 0 days. days.

(21) Appl. No.: 15/193,048

(22) Filed: Jun. 25, 2016

(51) Int. Cl.
| | |
|---|---|
| *H03H 7/30* | (2006.01) |
| *H03H 7/40* | (2006.01) |
| *H03K 5/159* | (2006.01) |
| *H04L 25/03* | (2006.01) |
| *H04B 7/0456* | (2017.01) |
| *H04L 12/26* | (2006.01) |

(52) U.S. Cl.
CPC ..... *H04L 25/03006* (2013.01); *H04B 7/0456* (2013.01); *H04L 43/028* (2013.01); *H04L 2025/03624* (2013.01)

(58) Field of Classification Search
None
See application file for complete search history.

(56) References Cited

U.S. PATENT DOCUMENTS

| | | | |
|---|---|---|---|
| 6,381,085 B1 * | 4/2002 | Du | G11B 20/10009 360/65 |
| 2003/0043894 A1 * | 3/2003 | Sestok, IV | H04L 25/03038 375/219 |
| 2004/0228397 A1 | 11/2004 | Bach | |

OTHER PUBLICATIONS

Lee et al., "Partial Zero-Forcing Adaptive MMSE Receiver for DS-CDMA Uplink in Multicell Environments" IEEE Transactions on Vehicular Tech. vol. 51, No. 5, Sep. 2002.*

* cited by examiner

*Primary Examiner* — Shuwang Liu
*Assistant Examiner* — Gina McKie
(74) *Attorney, Agent, or Firm* — Cesari & Reed LLP; Kirk A. Cesari (57) ABSTRACT

In certain embodiments, an apparatus may comprise a circuit configured to receive a plurality of samples of an input signal. The circuit may update one or more equalizer parameters using partial zero forcing equalization. Further, the circuit may generate an equalized signal based on the plurality of samples of the input signal and the one or more equalizer parameters.

17 Claims, 6 Drawing Sheets

PARTIAL ZERO FORCING EQUALIZATION

SUMMARY

In certain embodiments, an apparatus may comprise a circuit configured to receive a plurality of samples of an input signal. The circuit may update one or more equalizer parameters using partial zero forcing equalization. Further, the circuit may generate an equalized signal based on the plurality of samples of the input signal and the one or more equalizer parameters.

In certain embodiments, a system may comprise an adaptation circuit configured to update one or more equalizer parameters based on a plurality of samples of the input signal, a fraction of the minimum eigenvalue of a covariance matrix of the input signal and a step size. The system may further comprise an equalizer circuit configured to generate an equalized signal based on the plurality of samples of the input signal and the one or more equalizer parameters.

In certain embodiments, a method may comprise receiving a plurality of samples of an input signal. The method may comprise updating one or more equalizer parameters based on the plurality of samples of the input signal, a fraction of the minimum eigenvalue of a covariance matrix of the input signal and a step size. The method may further comprise generating an equalized signal based on the plurality of samples of the input signal and the one or more equalizer parameters.

DETAILED DESCRIPTION

In the following detailed description of the embodiments, reference is made to the accompanying drawings which form a part hereof, and in which are shown by way of illustrations. It is to be understood that features of the various described embodiments may be combined, other embodiments may be utilized, and structural changes may be made without departing from the scope of the present disclosure. It is also to be understood that features of the various embodiments and examples herein can be combined, exchanged, or removed without departing from the scope of the present disclosure.

In accordance with various embodiments, the methods and functions described herein may be implemented as one or more software programs running on a computer processor or controller. In accordance with another embodiment, the methods and functions described herein may be implemented as one or more software programs running on a computing device, such as a personal computer that is using a disc drive. Dedicated hardware implementations including, but not limited to, application specific integrated circuits, programmable logic arrays, and other hardware devices can likewise be constructed to implement the methods and functions described herein. Further, the methods described herein may be implemented as a computer readable storage medium or device including instructions that when executed cause a processor to perform the methods.

The present disclosure generally relates to the equalization of a signal, and in some embodiments, the present disclosure relates to equalization to reduce or eliminate inter-symbol interference (ISI) of a channel. Some systems, such as electrical, electronic, motor drive, processing, or other systems may receive a signal at a channel. The filtering or other operations of a channel may cause a spreading of individual data symbols passing through the channel. For consecutive symbols, this spreading may cause part of the symbol energy to overlap with neighbouring symbols causing inter-symbol interference (ISI). ISI may degrade the ability of a bit detector to differentiate a current symbol from the diffused energy of the adjacent symbols.

In some embodiments, a partial zero forcing algorithm may be employed to reduce inter-symbol interference (ISI) of a channel. For example, the partial zero forcing equalization algorithm, which does not force the ISI completely to zero, may utilize a fraction (or percentage) of the minimum eigenvalue of the data covariance matrix to equalize the received signal to reduce inter-symbol interference (ISI) as discussed in more detail below.

Figure 1:
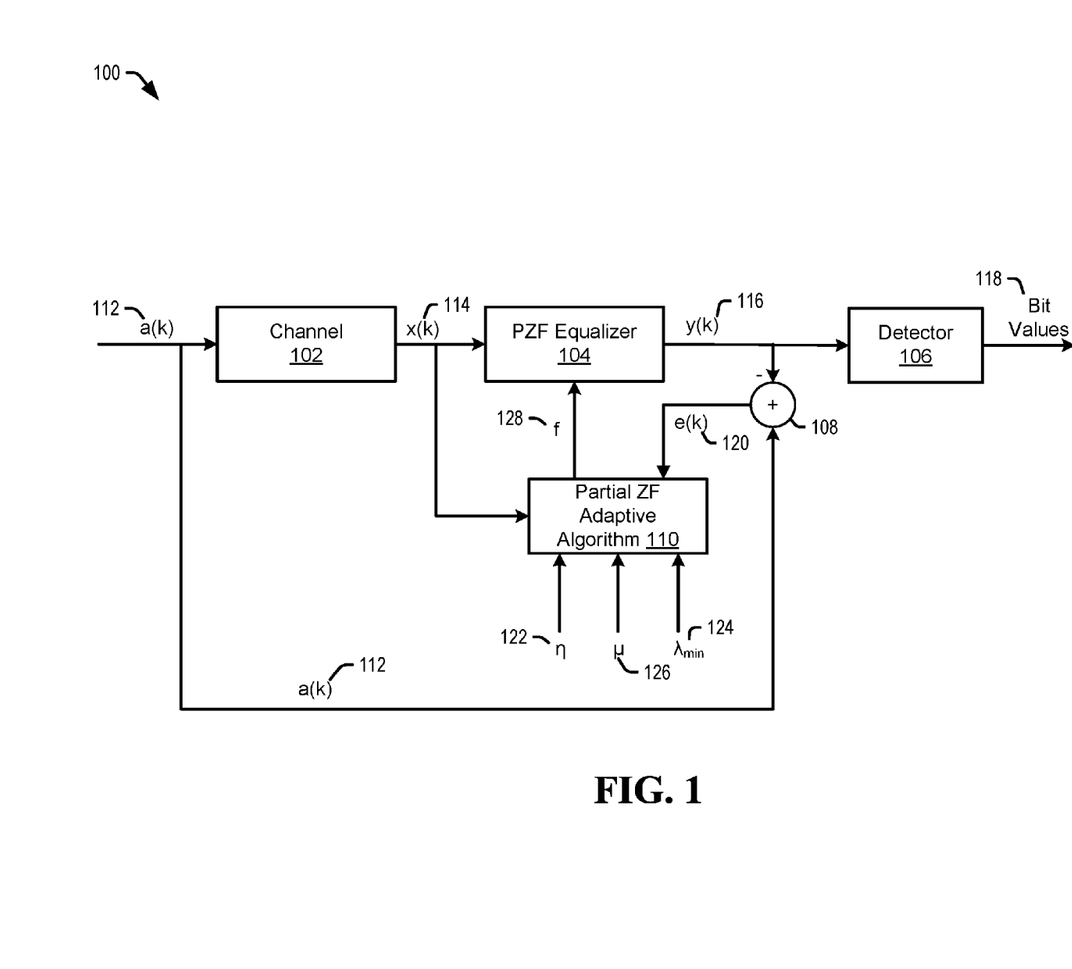
FIG. 1 is a block diagram of a system of partial zero forcing equalization, in accordance with certain embodiments of the present disclosure.

Referring to FIG. 1, a block diagram of a system of partial zero forcing equalization is shown and is generally designated 100. The system 100 can be one or more circuits configured to feed an input signal to a channel, perform partial zero forcing equalization to restore the signal fed to the channel by reducing or eliminating ISI caused by the channel, and perform bit detection on the equalized signal during the operation of the system 100. The system 100 can include a channel 102 coupled to a partial zero forcing (PZF) equalizer 104, the PZF equalizer 104 can be coupled to a detector 106 and an adder 108, and a partial zero forcing (PZF) adaptive algorithm 110 can be coupled to the PZF equalizer 104.

Each of the channel 102, PZF equalizer 104, detector 106, adder 108 and partial zero forcing (PZF) adaptive algorithm 110 may be a separate circuit, part of a system on chip (SOC), firmware, a processor(s), or other system not listed, or any combination thereof.

The channel 102 may receive the signal 112 a(k) and output the noisy signal 114 x(k) which may be a combination of the signal 112 and a noise component added by the channel, such as inter-symbol interference (ISI). In some embodiments, the signal 112 and signal 114 may be bit sequences. More particularly, in some embodiments, a(k)

may represent the channel input given as a binary non-return to zero (NRZ) sequence, (e.g., a(k) may take values such as −1 and +1 without returning to zero between symbols).

The PZF equalizer 104 may receive the noisy signal 114 x(k) which is to be equalized, for example, to reduce the noise component or inter-symbol interference (ISI). The PZF equalizer 104 may generate an equalized signal 116 y(k) based on the signal 114. In some embodiments, the samples of x(k) may be used to construct a vector having as many elements as the equalizer has taps. For example, for an equalizer having 2M+1 taps, x(k) may be used to construct a vector $x_k$, represented as:

$$x_k = (x_{k+M}, x_{k+M-1}, \ldots, x_k, \ldots, x_{k-M+1}, x_{k-M})^T \quad (1)$$

The detector 106 may operate to determine the bit value(s) 118 represented by the samples in the equalized signal 116.

The adder 108 may receive the equalized signal 116 and the signal 112 a(k). The adder 108 may combine the equalized signal 116 and the signal 112 to generate an error signal 120 e(k) which may represent the difference between the equalized signal 116 and the signal 112.

The partial zero forcing (PZF) adaptive algorithm 110 may receive the error signal 120, the noisy signal 114, a partial zero forcing fraction 122 ($\eta$), a step size 126 ($\mu$) and the minimum eigenvalue 124 ($\lambda_{min}$) of the data covariance matrix of the input signal. From the received signals and data, the partial zero forcing (PZF) adaptive algorithm 110 may generate the parameters 128 (f) of the PZF equalizer 104. For example, in an embodiment where the PZF equalizer is a finite impulse response (FIR) equalizer, the parameters 128 may be tap coefficients of the FIR.

The partial zero forcing (PZF) adaptive algorithm may overcome certain problems associated with zero-forcing equalization. For example, zero-forcing equalization for the equalizer taps may not be possible due to some rank deficiency of the associated linear system of equations.

The following discussion provides an example embodiment of the operations of system 100. The partial zero forcing (PZF) algorithm may deduct a fraction $\eta\lambda_{min}I$ from the covariance matrix $R_x$ as follows:

$$f = (R_x - \eta\lambda_{min}I)^{-1}P \quad (2)$$
$$= \tilde{R}_x^{-1}P$$

where $R_x = E(x_k x_k^T)$, P is the cross correlation vector given by $P = E(x_k a_k)$, $\eta$ is a fraction of unity given by $0<\eta<1$, and I is the identity matrix of compatible dimensions. Equation (2) is the result of minimizing:

$$J(f) = E[(a_k - f^T x_k)^2 - \eta\lambda_{min}f^T f] \quad (3)$$
$$= E[(a_k - f^T x_k)^2] - \eta\lambda_{min}f^T f$$

By differentiating (3), equation (4) is obtained:

$$\frac{\partial J(f)}{\partial f} = -2e_k x_k - 2\eta\lambda_{min}f \quad (4)$$

where $e_k = a_k - f^T x_k$ is the error between the channel input or desired signal and equalized signal $f^T x_k$.

From equation (4), a least-mean-squares (LMS) update of the equalizer parameters or taps may be formulated as:

$$f^{(k)} = f^{(k-1)} + \mu\left(-\frac{\partial J(f)}{\partial f}\right)_{f=f^{(k-1)}} \quad (5)$$
$$= f^{(k-1)} + \mu(e_k x_k + \eta\lambda_{min}f^{(k-1)})$$

where $\mu$ is the LMS step size.

Equation (5) may take the form:

$$f^{(k)} = (1+\mu\eta\lambda_{min})f^{(k-1)} + \mu e_k x_k \quad (6)$$

Equation (6) may represent the partial-zero forcing (PZF) update algorithm of block 110 of FIG. 1.

In some embodiments, the LMS adaptation parameters in equation (6) (e.g., $\mu$, $\eta$ and $\lambda_{min}$) may be obtained through some ad-hoc testing, such as one based on a trial-and-error approach. On the other hand, in some embodiments, an adaptive approach may be employed to estimate or update the minimum eigenvalue $\lambda_{min}$ along with the equalizer parameters or taps. The minimum eigenvalue $\lambda_{min}$ can be expressed as:

$$\lambda_{min} = \min\frac{v^T R_x v}{v^T v} \quad (7)$$

where v is the eigenvector of $R_x$ corresponding to the minimum eigenvalue $\lambda_{min}$.

The minimum eigenvalue $\lambda_{min}$ may be found by minimizing equation (7) with respect to the eigenvector v. Since v may be normalized to unity without loss of generality, equation (7) can be rewritten as:

$$\lambda_{min}(v) = \min\Sigma_k(v^T x_k)^2 \text{ subject to } v^T v = 1 \quad (8)$$

In equation (8), ergodicity may be assumed, where the ensemble average used in the computation of $R_x$ has been replaced by a time average. The minimization of the instantaneous form of (8) gives:

$$\frac{\partial \lambda_{min}(v)}{\partial v} = 2(v^T x_k)x_k - 2\rho v \quad (9)$$

where $\rho = (v^T x_k)^2$ is the Lagrange multiplier.

The update of $\lambda_{min}$ may be performed using a gradient-based LMS algorithm such as:

$$v^{(k)} = v^{(k-1)} + \mu_v\left(-\frac{\partial \lambda_{min}(v)}{\partial v}\right)_{v=v^{(k-1)}} \quad (10)$$
$$= v^{(k-1)} + \mu_v \alpha(x_k - \alpha v^{(k-1)})$$

where $\alpha = v^T x_k$ and $\mu_v$ is the LMS step size.

This may allow the update of $\lambda_{min}$ recursively as:

$$\lambda_{min}^{(k)} = \lambda_{min}^{(k-1)} + (\alpha^2 - \lambda_{min}^{(k-1)})/k \quad (11)$$

In particular, the minimum eigenvalue $\lambda_{min}$ can be estimated at each iteration using equation (11), which is then used to update the equalizer parameters for use in operations based on equation (6) as shown in equation (12) below:

$$f^{(k)} = (1+\mu\eta\lambda_{min}^{(k)})f^{(k-1)} + \mu e_k x_k \quad (12)$$

As such, equation (12) is a variant of the partial zero-forcing algorithm in which the minimum eigenvalue $\lambda_{min}^{(k)}$ is updated systematically using equation (11).

Figure 2:
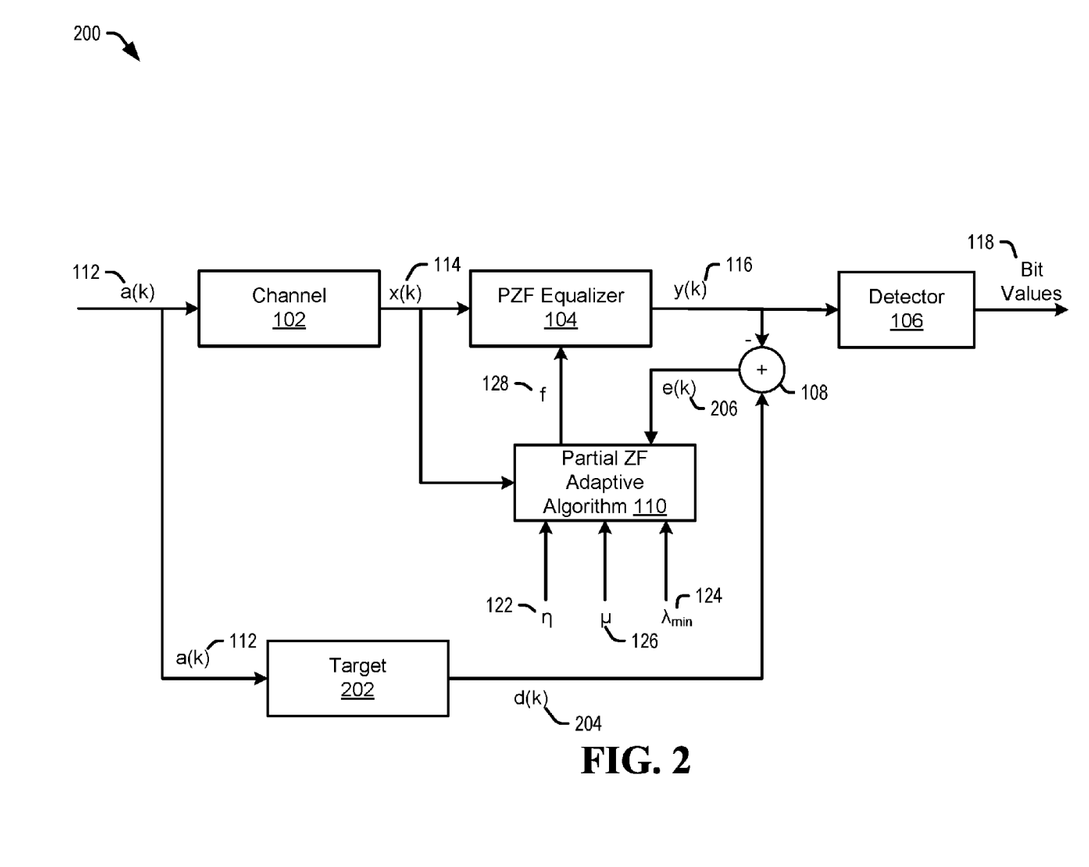
FIG. 2 is a block diagram of a system of partial zero forcing equalization, in accordance with certain embodiments of the present disclosure.

Referring to FIG. 2, a block diagram of a system of partial zero forcing equalization is shown and is generally designated 200. In some embodiments, system 200 may be a variation of system 100 in which partial response equalization is employed.

System 200 can include a channel 102 coupled to a PZF equalizer 104, the PZF equalizer 104 can be coupled to a detector 106 and an adder 108, the adder 108 coupled to a partial zero forcing (PZF) adaptive algorithm 110, the partial zero forcing (PZF) adaptive algorithm 110 can be coupled to the PZF equalizer 104 and a target 202 coupled to the adder 108. Generally, the operations of the channel 102, PZF equalizer 104, detector 106 and partial zero forcing (PZF) adaptive algorithm 110 with respect to signals 112, 114, 116, 118, 122 and 124 may be the same as in FIG. 1 and will not be described.

Each of the channel 102, PZF equalizer 104, detector 106, adder 108, partial zero forcing (PZF) adaptive algorithm 110 and the target 202 may be a separate circuit, a system on chip (SOC), firmware, a processor(s), or other system not listed, or any combination thereof.

As illustrated, the target 202 generates a desired or target signal 204 d(k). For example, the target 202 may generate the desired signal 204 by passing the NRZ sequence a(k) 114 through a given target response $g_k$ of length $L_g$ and with frequency response $G(\omega)$. In some embodiments, the desired signal may be given as:

$$d_k = \sum_{i=0}^{L_g-1} g_i a_{k-i} \quad (13)$$

The equations provided above with regard to FIG. 1 may be made to apply to system 200 by replacing the channel input $\alpha_k$ with the desired signal $d_k$.

For example, the adder 108 may receive the equalized signal 116 and the desired signal 204. The adder 108 may combine the equalized signal 116 and the desired signal 204 to generate an error signal 206 e(k) which may represent the difference between the equalized signal 116 and the desired signal 204. As such, the error may be computed as:

$$e_k = d_k - f^T x_k \quad (14)$$

In turn, the partial zero-forcing algorithm for partial response (PR) equalization may be given by equation (6) but with $e_k$ as defined by equation (14):

$$f^{(k)} = (1+\mu\eta\lambda_{min})f^{(k-1)} + \mu e_k x_k \quad (15)$$

or may be given by equation (12) with $e_k$ as defined by (14) and $\lambda_{min}^{(k)}$ as updated using equation (11):

$$f^{(k)} = (1+\mu\eta\lambda_{min}^{(k)})f^{(k-1)} + \mu e_k x_k \quad (16)$$

Figure 3:
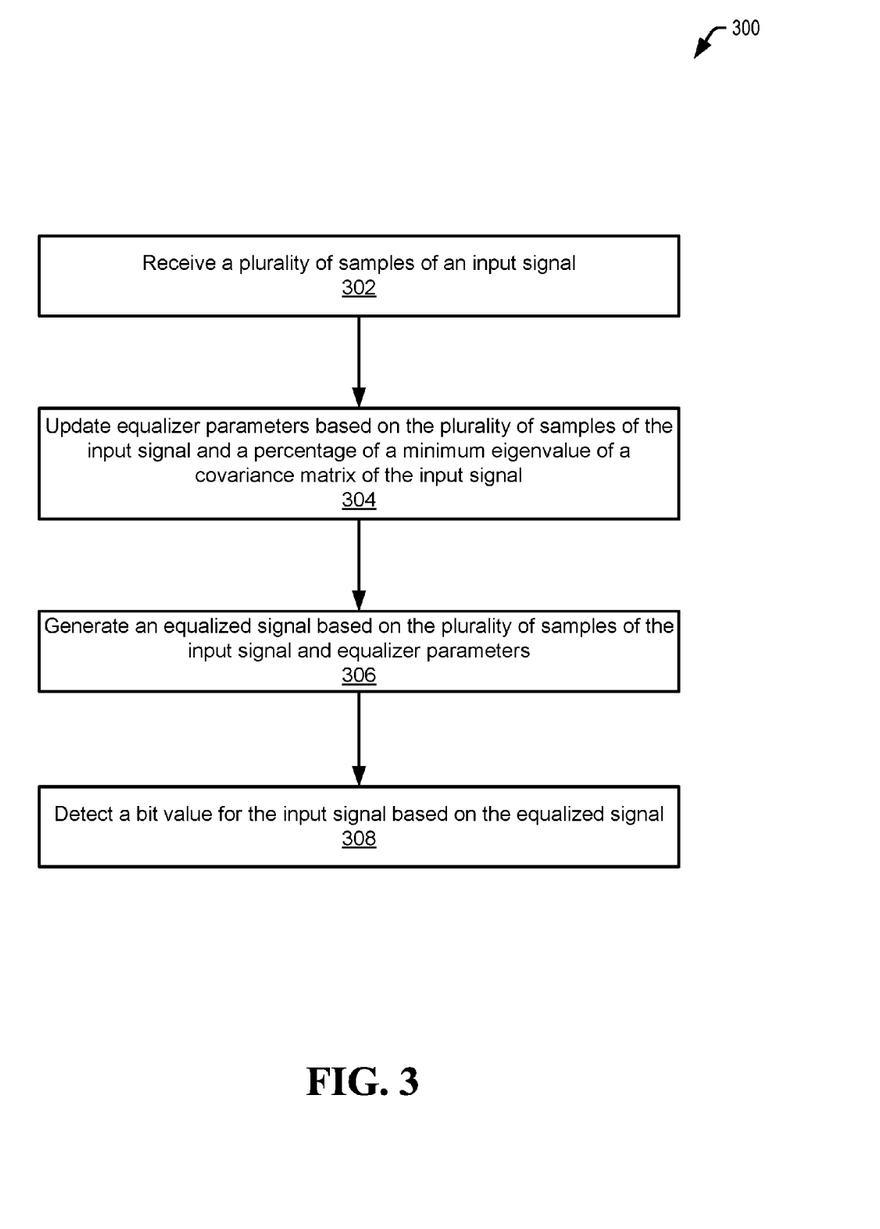
FIG. 3 is a flowchart of a method of partial zero forcing equalization, in accordance with certain embodiments of the present disclosure.

Referring to FIG. 3, a flowchart of a method of partial zero forcing equalization is shown and is generally designated 300. The method 300 can be an embodiment of the systems 100 or 200.

The system may receive a plurality of samples of an input signal, at 302. The system may then update the equalizer parameters based on the plurality of samples of the input signal and a fraction of the minimum eigenvalue of the covariance matrix of the input signal, at 304, for example, as discussed above with regard to FIGS. 1 and 2. At 306, the system may generate an equalized signal based on the plurality of samples of the input signal and the equalizer parameters, for example, as discussed above with regard to FIGS. 1 and 2. At 308, the system may detect a bit value for the input signal based on the equalized signal. After 308, the system may continue at 302.

All steps listed for the method 300 may be applied to systems that have equalization of a signal. This and other variations would be apparent to one of ordinary skill in the art in view of this specification. Components and circuits used to perform the operations in the method may be discrete, integrated into a system on chip (SOC), or other circuits. Further, the steps can be carried out in a processor (e.g. a digital signal processor), implemented in software, implemented via firmware, or by other means.

Figure 4:
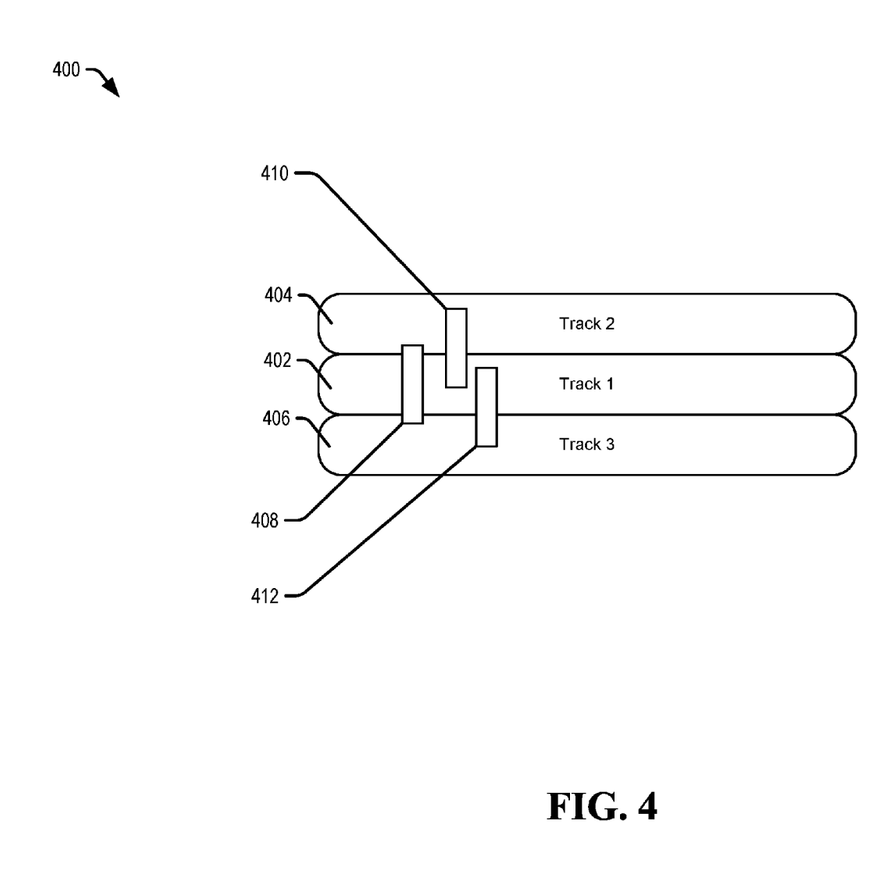
FIG. 4 is a block diagram of a track layout for a multi-sensor magnetic recording (MSMR) media, in accordance with certain embodiments of the present disclosure.
Figure 5:
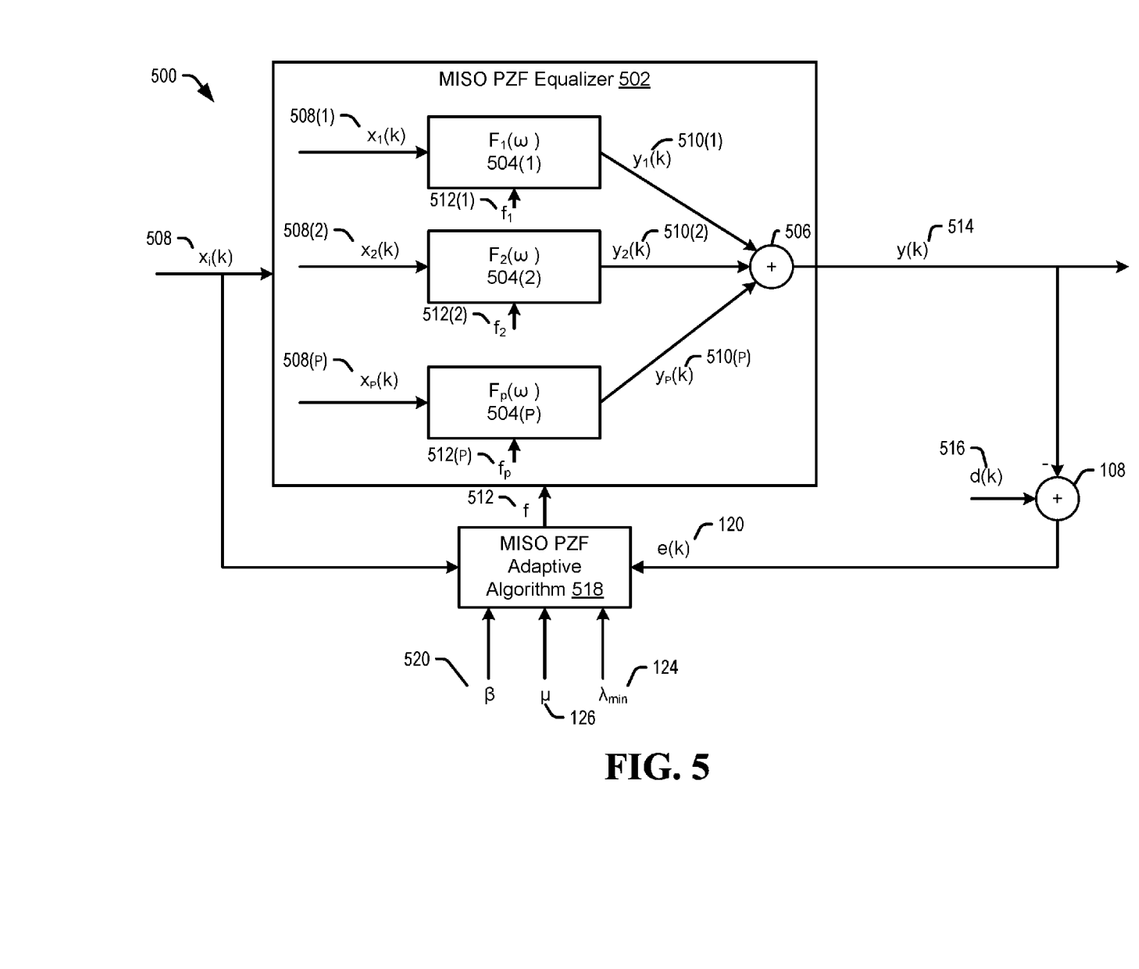
FIG. 5 is a block diagram of a system of partial zero forcing equalization in a multi-sensor magnetic recording (MSMR) system, in accordance with certain embodiments of the present disclosure.

FIGS. 4 and 5 illustrate the extension of partial zero forcing equalization to a multi-sensor magnetic recording (MSMR) system. FIG. 4 illustrates a block diagram showing a track layout for a MSMR media generally designated 400. In particular, three tracks are shown, track 1 402, track 2 404 and track 3 406. Track 1 402 may be the track of interest. Multiple readers, specifically reader 1 408, reader 2 410 and reader 3 412 may capture information from track 1 at different read positions. The captured information may be provided to a multiple-input single output (MISO) equalizer such as that illustrated in FIG. 5.

Referring to FIG. 5, a block diagram of a system of partial zero forcing equalization in a multi-sensor magnetic recording (MSMR) system is shown and is generally designated 500. In some embodiments of system 500, the system may receive multiple input read-back signals from multiple readers of the MSMR system. System 500 may then perform partial zero forcing equalization on the multiple received signals, combine the results to generate an equalized signal for bit detection.

System 500 can include a multiple-input single output (MISO) partial zero forcing (PZF) equalizer 502 coupled to an adder 108, the adder 108 coupled to a MISO partial zero forcing (PZF) adaptive algorithm 518, and the MISO PZF adaptive algorithm 518 coupled to the MISO PZF equalizer 502. Each of the MISO PZF equalizer FIRs 502, the adder 108 and the MISO PZF adaptive algorithm 518 may be a separate circuit, a system on chip (SOC), firmware, a processor(s), or other system not listed, or any combination thereof.

As mentioned above, the system 500 may include a MISO PZF equalizer 502 that may receive an overall input signal $x_i(k)$ 508 that includes p input signals, $x_1(k)$ 508(1), $x_2(k)$ 508(2), ... $x_p(k)$ 508(p). Each of the p input signals 508 may be provided to a corresponding filter $F_i(\omega)$ 504(1)-504(p). Each of the filters 504(1)-504(p) may output an equalized signal, $y_1(k)$ 510(1), $y_2(k)$ 510(2), ... $y_p(k)$ 510(p) based on a respective input signal 508 and a set of equalizer parameters $f_1$ 512(1), $f_2$ 512(2), ... $f_p$ 512(p). The equalized signals $y_1(k)$ 510(1)-$y_p(k)$ 510(p) may be summed by an adder 506 to generate an overall equalized signal y(k) 514 that may be sent to a detector for bit detection.

The adder 108 may receive the overall equalized signal y(k) 514 and a desired signal 516 d(k). The adder 108 may combine the equalized signal 116 and the signal 516 to generate an error signal 120 e(k) which may represent the difference between the equalized signal 116 and the desired signal 516.

The multiple input, single output (MISO) partial zero forcing (PZF) adaptive algorithm 518 may receive the error signal 120, the p input signals 508 $x_i(k)$, i=1,2, . . . , p, a partial zero forcing fraction 520 ($\beta$), a step size 126 ($\mu$) and the minimum eigenvalue ($\lambda_{min}$) 124 of the data covariance matrix of the input signal. From the received signals and data, the MISO PZF adaptive algorithm 518 may generate the overall parameter vector f 512 including the parameters $f_1$ 512(1), $f_2$ 512(2), ... $f_p$ 512(p) of the filters 504 of the MISO PZF equalizer 502.

The following discussion provides an example embodiment of the operations of system 500, particularly the MISO PZF adaptive algorithm. The error signal 120 e(k) may be given by:

$$e(k)=d(k)-y(k)=d(k)-f^T x_k \quad (17)$$

where $$f=(f_1^T, f_2^T, \ldots, f_p^T)^T$$

In some embodiments, the desired signal 516 may be defined as:

$$d(k) = \sum_{i=0}^{L_g-1} g_i a_{k-i} \quad (18)$$

where the $g_i$'s are the coefficients of the front-end target with length $L_g$, and the $\alpha_k$'s are the NRZ bit sequence written on the track of interest.

Similarly, the overall parameter vector f 512 and the p input signals 508 ($x_i(k)$, i=1,2,...,p) may be defined as:

$$f=(f_1^T, f_2^T, \ldots, f_p^T)^T$$

$$f_i=(f_{i,0}, f_{i,1}, \ldots, f_{i,M-1})^T \quad (19)$$

$$x_k=[x_1^T(k), x_2^T(k), \ldots, x_p^T(k)]^T$$

$$x_i(k)=[x_i(k), x_i(k-1), \ldots, x_i(k-M+1)]^T \quad (20)$$

for i=1, 2, ... p, where M is the number of parameters (taps) associated with each filter 504 of the MISO PZF equalizer 502, and p is the number of MISO filters 504.

The MISO PZF equalizer 502 may be designed by minimizing the mean-square error criterion:

$$J(f_2, f_2, \ldots, f_p)=E(e^2(k)) \quad (21)$$

The minimization of (21) results in the Wiener solution of the form:

$$f=R^{-1}P \quad (22)$$

where $$R=E[x_k x_k^T]$$

$$P=E[x_k d(k)] \quad (23)$$

As such, the partial zero-forcing parameter vector of the MISO PZF equalizer 502 may be expressed as:

$$f=(R-\beta \lambda_{min} I)^{-1} P \quad (24)$$

where $\lambda_{min}$ is the minimum eigenvalue of R and β is a fraction of unity (0<β<1) indicating the fraction or fraction of $\lambda_{min}$ to be subtracted from the diagonal entries of R.

In some embodiments, the equalizer parameters f are estimated using an LMS-type PZF adaptive algorithm of the form:

$$f^{(k)}=(1+\mu\beta\lambda_{min}^{(k)})f^{(k-1)}+\mu e_k x_k \quad (25)$$

where μ is the step size. In turn, the individual MISO filter parameters may be adapted as $$f_i^{(k)}=(1+\mu_i\beta\lambda_{min})f_i^{(k-1)}+\mu_i e_k x_i(k) \quad (26)$$

for i=1, 2, ... p, where $\mu_i$ is the step size associated with the ith MISO filter 504(i).

The minimum eigenvalue $\lambda_{min}$ may be updated iteratively using:

$$\lambda_{min}^{(k)}=\lambda_{min}^{(k-1)}+(\alpha^2-\lambda_{min}^{(k-1)})/k \quad (27)$$

At each iteration, a new value of $\lambda_{min}$ is used to update the equalizer parameters of the MISO filters 504 as:

$$f_i^{(k)}=(1+\mu_i\beta\lambda_{min}^{(k)})f_i^{(k-1)}+\mu_i e_k x_i(k), i=1,2,\ldots,p \quad (28)$$

In some embodiments, equation (28) may represent the MISO PZF adaptive algorithm of block 518 of FIG. 5.

Figure 6:
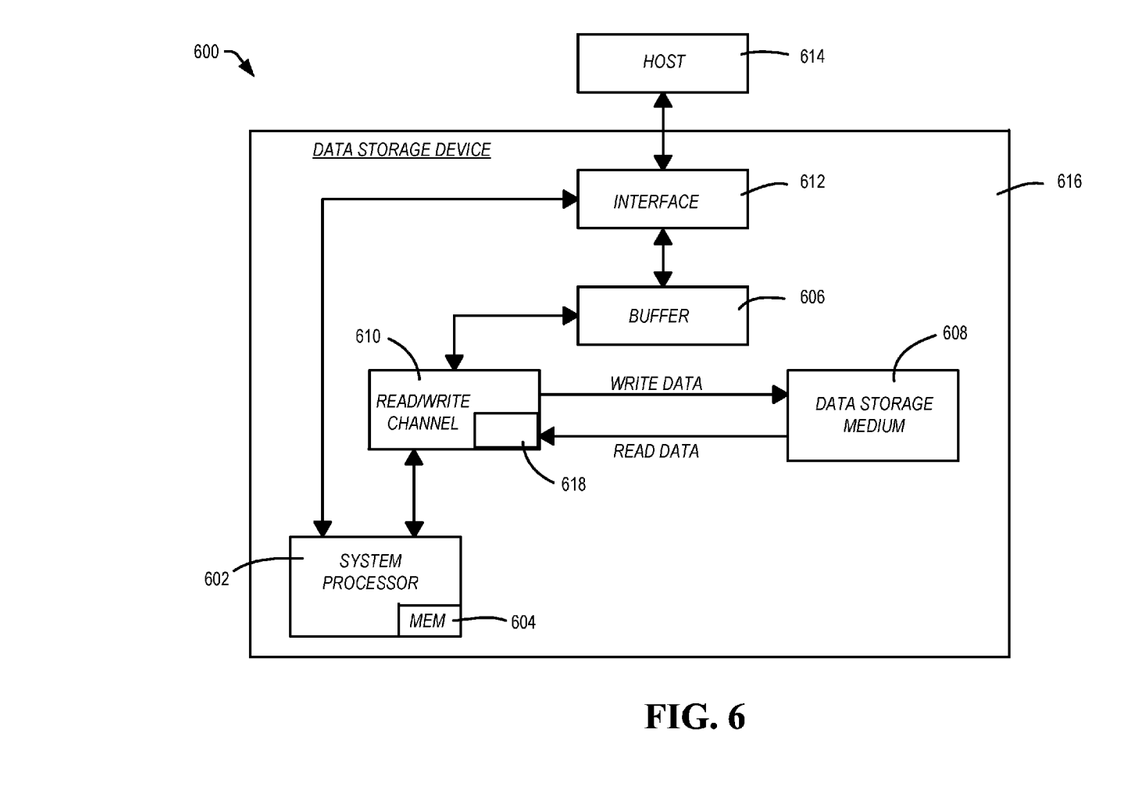
FIG. 6 is a block diagram of a system of partial zero forcing equalization, in accordance with certain embodiments of the present disclosure.

Referring to FIG. 6, a block diagram of a system of partial zero forcing equalization is shown and generally designated 600. The system 600 can be an example of a data storage device (DSD), and may be an example implementation of systems 100, 200 or 500. The DSD 616 can optionally connect to and be removable from a host device 614, which can be a device or system having stored data, such as a desktop computer, a laptop computer, a server, a digital video recorder, a photocopier, a telephone, a music player, other electronic devices or systems not listed, or any combination thereof. The data storage device 616 can communicate with the host device 614 via the hardware/firmware based host interface circuit 612 that may include a connector (not shown) that allows the DSD 616 to be physically connected and disconnected from the host 614.

The DSD 616 can include a system processor 602, which may be a programmable controller, and associated memory 604. The system processor 602 may be part of a system on chip (SOC). A buffer 606 may temporarily store data during read and write operations and can include a command queue. The read/write (R/W) channel 610 can encode data during write operations to, and reconstruct data during read operations from, the data storage medium 608. The data storage medium 608 is shown and described as a hard disc drive, but may be other types of medium, such as a flash medium, optical medium, or other medium, or any combination thereof.

The R/W channel 610 may receive data from more than one data storage medium at a time, and in some embodiments can also receive multiple data signals concurrently, such as from more than one output of a read head. For example, storage systems having two-dimensional magnetic recording (TDMR) systems can have multiple reading or recording elements, and can read from two tracks simultaneously or nearly simultaneously. Multi-dimensional recording (MDR) systems can receive two or more inputs from multiple sources (e.g. recording heads, flash memory, optical memory, and so forth). The R/W channel 610 can combine multiple inputs and provide a single output, as described in examples herein.

The block 618 can implement all of or part of the systems and functionality of systems 100, 200 and 500. In some embodiments, the block 618 may be a separate circuit, integrated into the R/W channel 610, included in a system on chip, firmware, software, or any combination thereof.

The illustrations, examples, and embodiments described herein are intended to provide a general understanding of the structure of various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, the figures and above description provide examples of architecture and voltages that may be varied, such as for design requirements of a system. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above examples, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. An apparatus comprising:
a circuit configured to:
receive a plurality of samples of an input signal;
update one or more equalizer parameters based on the plurality of samples of the input signal using partial zero forcing equalization, the update of one of the one or more equalizer parameters based at least in part on a product of a fraction of the minimum eigenvalue of a covariance matrix of the input signal and a current value of the one of the one or more equalizer parameters; and
generate an equalized signal based on the plurality of samples of the input signal and the one or more equalizer parameters.

2. The apparatus of claim 1, further comprising the circuit further configured to update the minimum eigenvalue of the covariance matrix of the input signal iteratively on a sample by sample basis.

3. The apparatus of claim 1, further comprising the circuit further configured to generate the equalized signal using a fraction of the minimum eigenvalue of the covariance matrix of the input signal.

4. The apparatus of claim 1, further comprising the circuit further configured to:
generate a target signal;
generate an error signal based on the equalized signal and the target signal; and
the update of the one or more equalizer parameters being further performed based on the error signal.

5. The apparatus of claim 1, further comprising the circuit configured to:
receive a plurality of additional samples of the input signal, the plurality of additional samples of the input signal having a different source from a source of the plurality of samples of the input signal;
the update of the one or more equalizer parameters being further based on the plurality of additional samples of the input signal; and
the generation of the equalized signal being performed by:
equalizing the plurality of samples of the input signal based on the one or more equalizer parameters to generate a first equalized signal;
equalizing the plurality of additional samples of the input signal based on the one or more equalizer parameters to generate a second equalized signal;
combining the first equalized signal and the second equalized signal to generate the equalized signal.

6. The apparatus of claim 5, further comprising the circuit further configured to perform the equalization of the plurality of samples of the input signal based on a first set of the one or more equalizer parameters and to perform the equalization of the plurality of additional samples of the input signal based on a second set of the one or more equalizer parameters.

7. The apparatus of claim 5, further comprising the source and the different sources are read heads of a multi-sensor magnetic recording system.

8. The apparatus of claim 1, the circuit further comprising a detector that operates to generate an output signal as a plurality of bit values based on the equalized signal.

9. A system comprising:
an adaptation circuit configured to update one or more equalizer parameters based on a plurality of samples of the input signal, a fraction of the minimum eigenvalue of a covariance matrix of the input signal and a step size, the update of one of the one or more equalizer parameters based on a product of the fraction of the minimum eigenvalue of the covariance matrix of the input signal and a current value of the one of the one or more updatable equalizer parameters; and
an equalizer circuit configured to generate an equalized signal based on the plurality of samples of the input signal and the one or more equalizer parameters.

10. The system of claim 9, further comprising the adaptation circuit configured to update the minimum eigenvalue of the covariance matrix of the input signal iteratively on a sample by sample basis.

11. The system of claim 9, further comprising the equalizer circuit configured to perform the generation of the equalized signal using a modified zero forcing algorithm utilizing the fraction of the minimum eigenvalue of the covariance matrix of the input signal.

12. The system of claim 9, further comprising:
a target circuit configured to generate a target signal;
an adder circuit configured to generate an error signal based on the equalized signal and the target signal; and
the adaptation circuit configured to perform the update of the one or more equalizer parameters based on the error signal.

13. The system of claim 9, further comprising:
the adaptation circuit further configured to update the one or more equalizer parameters based on a plurality of additional samples of the input signal, the plurality of additional samples of the input signal having a different source from a source of the plurality of samples of the input signal;
the equalizer circuit including:
a first filter configured to equalize the plurality of samples of the input signal based on the one or more equalizer parameters to generate a first equalized signal;
a second filter configured to equalize the plurality of additional samples of the input signal based on the one or more equalizer parameters to generate a second equalized signal; and
an adder circuit configured to combine the first equalized signal and the second equalized signal to generate to the equalized signal.

14. The system of claim 13, further comprising the source and the different source being read heads of a multi-sensor magnetic recording system.

15. A method comprising:
receiving a plurality of samples of an input signal;
updating one or more equalizer parameters based on the plurality of samples of the input signal, a fraction of the minimum eigenvalue of a covariance matrix of the input signal and a step size, the updating of one of the one or more equalizer parameters based on a product of the fraction of the minimum eigenvalue of the covariance matrix of the input signal and a current value of the one of the one or more updatable equalizer parameters; and generating an equalized signal based on the plurality of samples of the input signal and the one or more equalizer parameters.

16. The method of claim 15, further comprising:

generating a target signal;

generating an error signal based on the equalized signal and the target signal; and the updating of the one or more equalizer parameters being further performed based on the error signal.

17. The method of claim 15, further comprising generating the equalized signal using a modified zero forcing algorithm utilizing the fraction of the minimum eigenvalue of the covariance matrix of the input signal.

* * * * *